Nov. 30, 1954
H. L. WEBSTER
2,695,577
TRANSPLANTER
Filed July 5, 1949
5 Sheets-Sheet 3
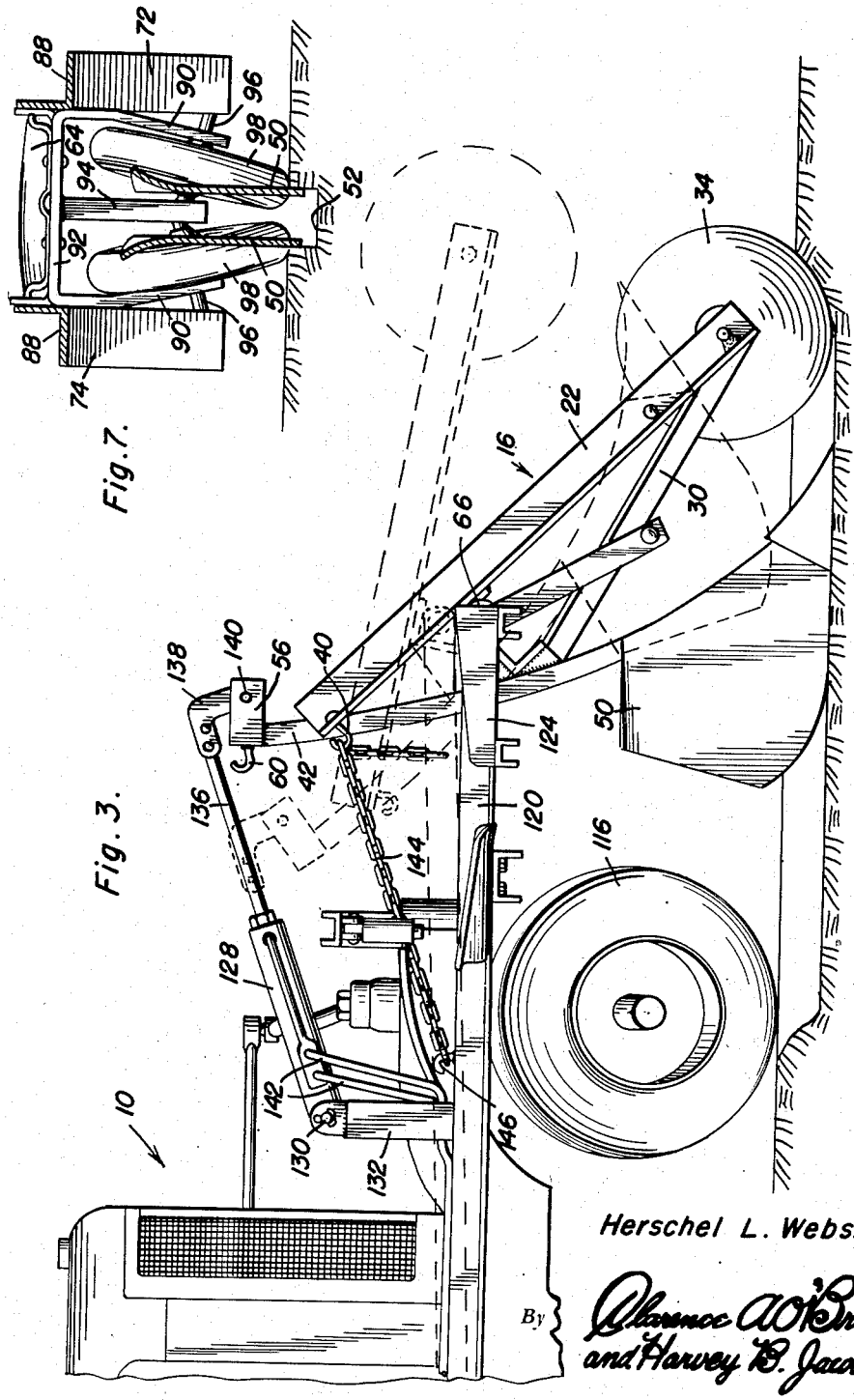
Inventor
Herschel L. Webster Nov. 30, 1954  H. L. WEBSTER  2,695,577
TRANSPLANTER
Filed July 5, 1949  5 Sheets-Sheet 4
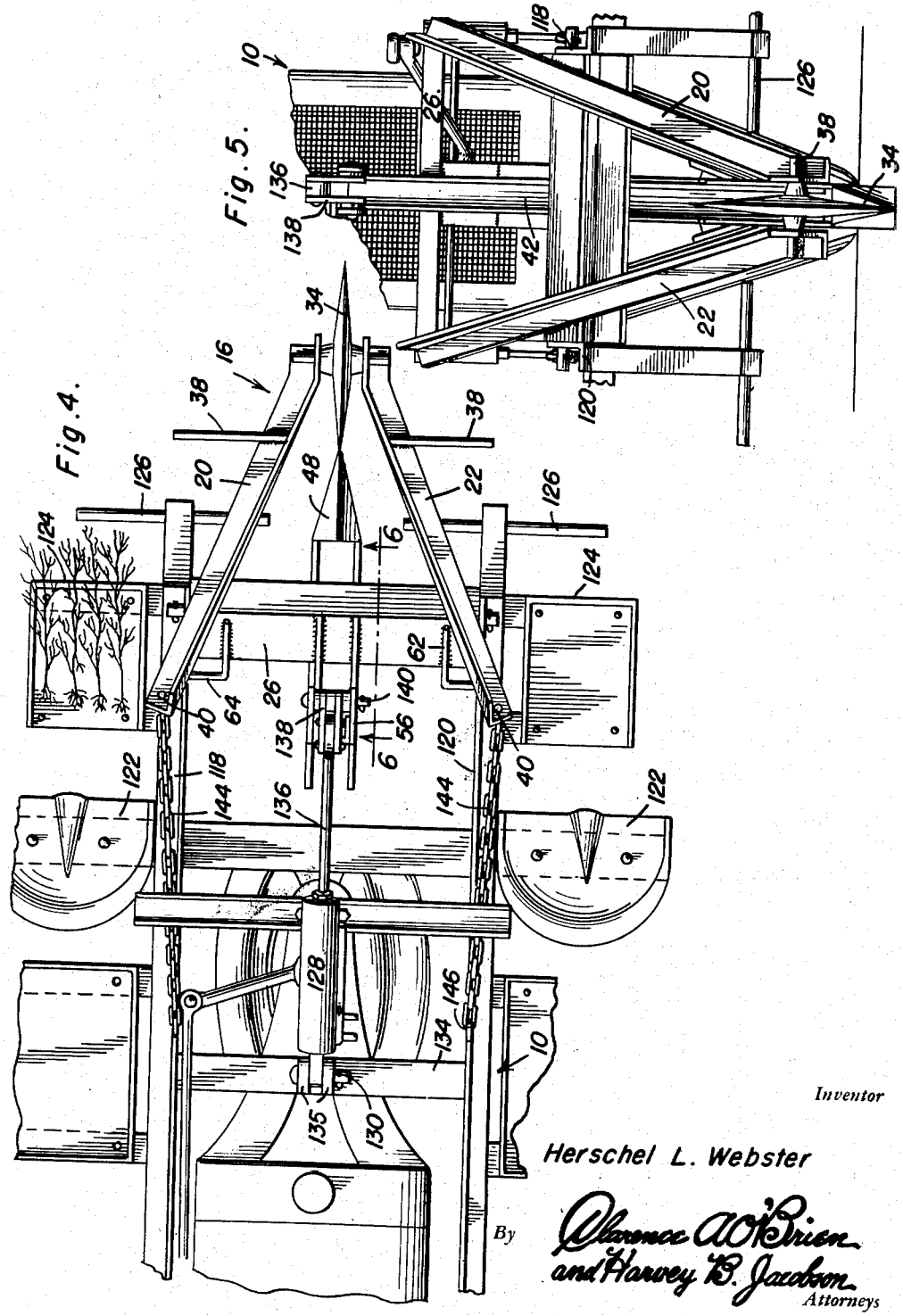
Inventor
Herschel L. Webster

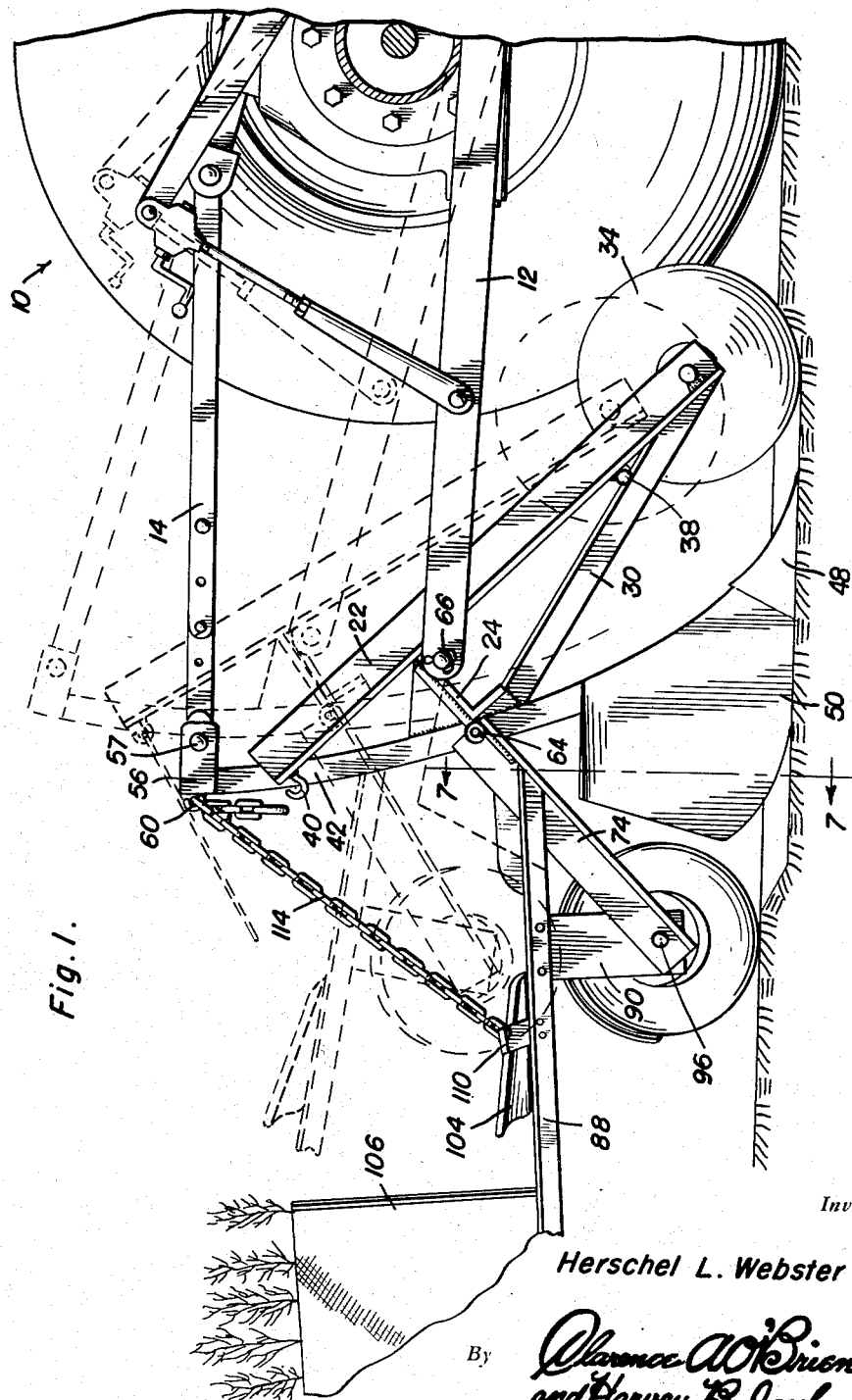
Fig. I.
Inventor
Herschel L. Webster

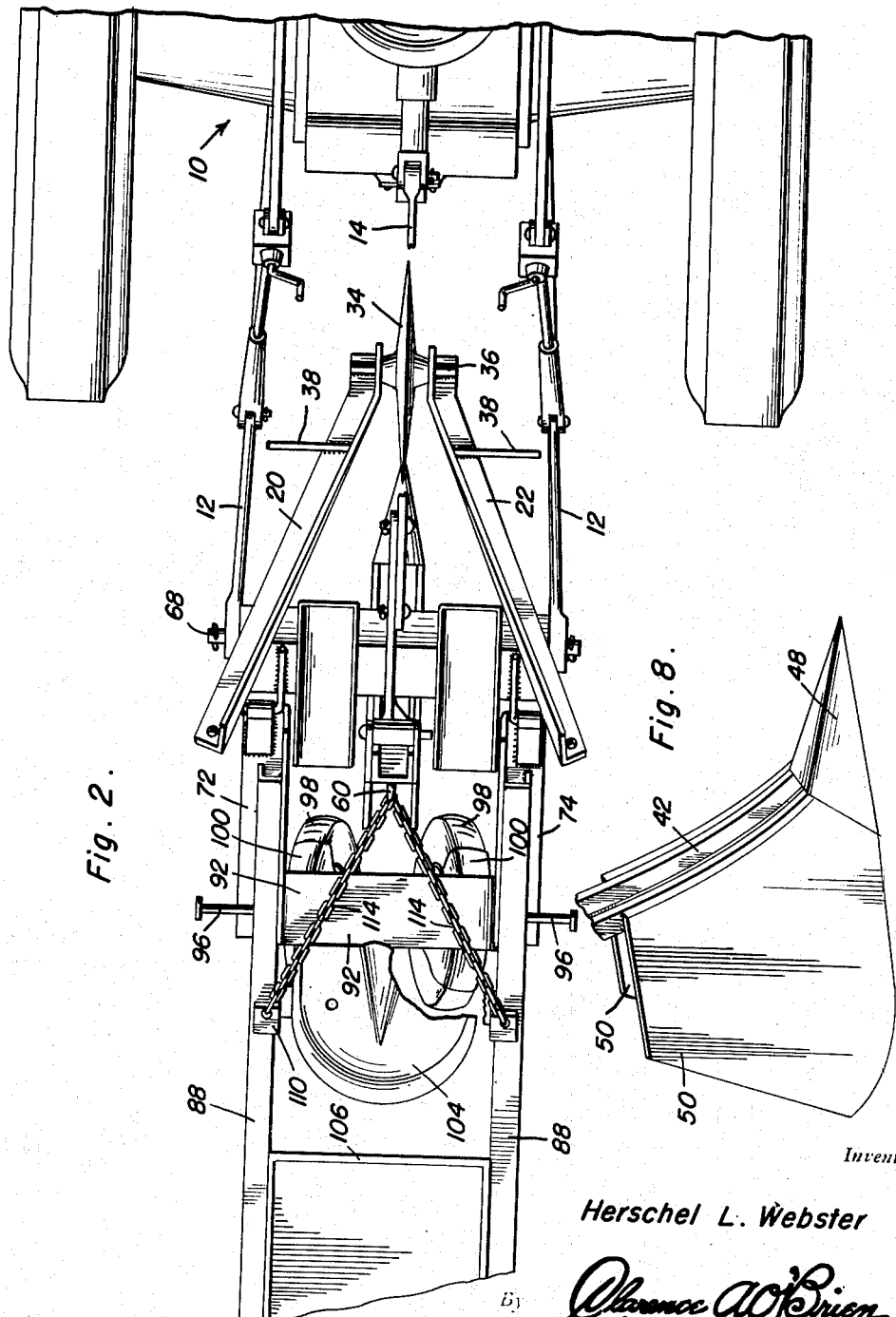

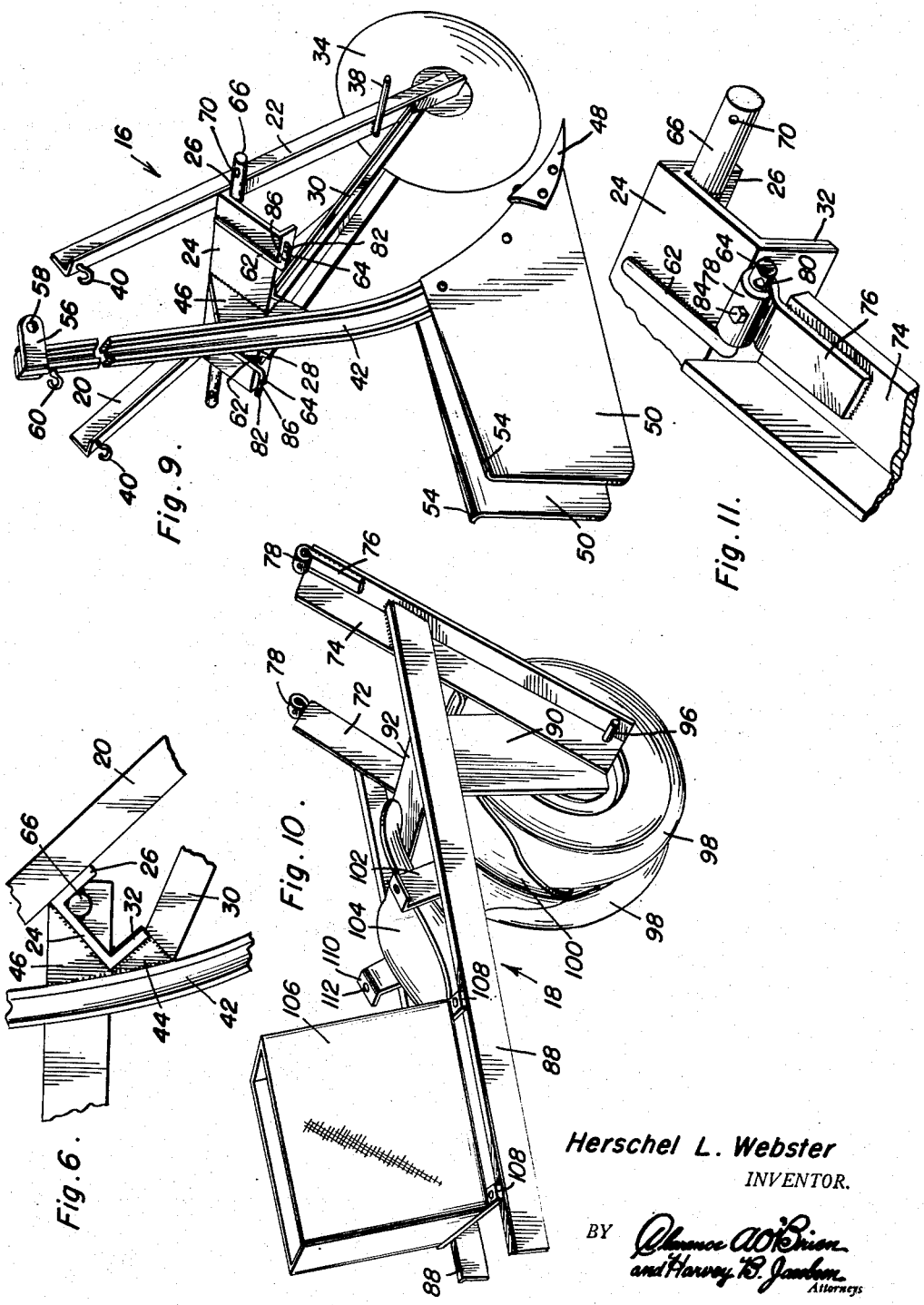

United States Patent Office 2,695,577
Patented Nov. 30, 1954

2,695,577

TRANSPLANTER

Herschel L. Webster, Cornelia, Ga.

Application July 5, 1949, Serial No. 103,096

1 Claim. (Cl. 111—62)

This invention comprises novel and useful improvements in a transplanter and more specifically pertains to an agricultural attachment for association with a farm tractor for efficiently and with celerity transplanting seedlings and the like. More particularly, this invention relates to similar subject matter and embodies improvements over the invention disclosed in the prior patent of Walling No. 1,972,281, patented September 4, 1934, for a Method of and Apparatus for Reforestation.

Generally speaking, the present invention, as that set forth in the patent to Walling, relates to agricultural implements which include a coulter disk for breaking the soil in a continuous trench or groove, followed by a narrow plow for opening a trench or furrow, which plow is provided with rearwardly extending and laterally spaced wings or shields extending backwardly from both sides of the plow, to thus maintain a clear space in the furrow being opened immediately to the rear of the plow, in which a seedling may be positioned by the operator in the furrow so held open, together with a pair of heeling wheels for packing the earth in the furrow about the seedling and thereby setting and planting the same.

The present invention has as its fundamental purpose the provision of an apparatus of the nature set forth in the preceding paragraph which may be easily attached to the implement power lift of a tractor whereby the entire attachment including the operator or operator's position thereon may be easily raised or lowered as desired.

A very important object of the invention, therefore, is to provide a transplanting attachment which may be readily raised above the soil to enable the tractor and the attachment to be maneuvered or turned and transported as desired.

A further important object of the invention is to provide an attachment capable of operation by the implement power lift of a tractor, which attachment is capable of automatically performing the necessary operations in the soil, supports a hopper or bin of seedlings to be transplanted, and has provision for supporting and operating in convenient position for planting the seedlings.

Yet another important object of the invention is to provide an attachment which is capable of mounting selectively upon the rear of a tractor upon the implement power lift thereof, or upon the forward end of the tractor as desired.

And a final important object of the invention to be specifically enumerated herein is to provide an attachment in conformity with the foregoing objects which shall be capable of very easy attachment to a tractor or removal therefrom; which may be secured to the tractor in various operative positions; and which is, withal, highly efficient and compact for the purposes intended.

These, together with various ancillary features and objects of the invention which will later become apparent as the following description proceeds, are attained by this device, preferred embodiments of which have been illustrated by way of example only in the accompanying drawings, wherein:

Figure 1 is a fragmentary side elevational view showing one embodiment of the invention mounted upon the implement power lift of a conventional type of farm tractor, the device being shown in its operative position in full lines and in its elevated or inoperative position in dotted lines therein;

Figure 2 is a top plan view of the embodiment of the invention illustrated in Figure 1;

Figure 3 is a side elevational view showing the attachment mounted upon the front of a tractor, the operative position of the device being indicated in full lines and the elevated or inoperative position thereof being shown in dotted lines;

Figure 4 is a top plan view of the arrangement of Figure 3;

Figure 5 is a front elevational view of the arrangement of Figure 3, parts being broken away and omitted;

Figure 6 is a vertical longitudinal sectional view taken substantially upon the plane of section line 6—6 of Figure 4 and illustrating a constructional detail of the invention;

Figure 7 is a vertical transverse sectional detail view taken substantially upon the plane of the section line 7—7 of Figure 1;

Figure 8 is a perspective view of the plow, a portion of the plow beam and of the plow side wings forming a part of the invention;

Figure 9 is a perspective view of the plow and coulter disk portion of the device, parts being omitted;

Figure 10 is a perspective view of the heeling wheels, hopper and seat portion of the device; and Figure 11 is a perspective view of a detail illustrating the manner of securing together the two portions of Figures 9 and 10.

Referring now more specifically to the accompanying drawings, wherein like numerals designate similar parts throughout the various views, attention is directed first to the embodiment of Figures 1, 2, 6—11, which discloses the attachment as applied to the implement power lift at the rear of a conventional form of farm tractor.

In Figures 1 and 2, there is shown the rear portion of a farm tractor, indicated generally by the numeral 10, this rear portion being provided with a pair of lower hydraulically operated implement lift bars 12 and an upper implement compression bar 14 of a conventional design. In this embodiment of the invention, the transplanter attachment to be now described is associated with the implement lift and compression bars of the tractor for support thereby.

The attachment itself consists of a pair of sections pivotally attached together, the forward or plow section being indicated generally by the numeral 16 in Figure 9, while the rear or heeling attachment is indicated generally by the numerals 18 and is shown in Figure 10. The forward section 16 includes a rigid frame consisting of a pair of angle iron side members 20 and 22 which are upwardly diverging and backwardly slanting and which are rigidly connected, as by welding, to a transversely disposed channel iron frame member 24 to one of the flanges 26 thereof. A pair of angle iron brace members 28 and 30 are likewise welded to the channel member 24 at the other flange 32 thereof, and are welded to the members 20 and 22 adjacent the lower ends of the same.

The lower ends of the members 20 and 22 terminate in spaced relation to each other and journal therebetween a coulter disk 34 upon a transverse axle 36 whose ends are welded to the extremities of the angle iron frame members 20 and 22, as will be apparent from Figure 2. The coulter disk 34 is thus free to rotate upon the rigid frame construction. Welded or otherwise secured to the frame of the front section 16 are a pair of laterally extending foot rests 38 in the form of rods. At their upper extremities, the frame members 20 and 22 are provided with rearwardly extending hooks 40 which are not employed when the attachment is mounted upon the rear of the tractor, as in Figures 1 and 2, but possess a function when the attachment is secured to the front of the tractor, as set forth hereinafter with reference to the embodiment of Figures 3 and 4.

A plow beam consisting of an eye beam 42 is rigidly attached to the flange 32 of the channel member 24 of the frame of the front section, as by welding or the like, through the agency of a triangular shaped part 44 constituting a bracket by means of which the eye beam is attached to the channel member. A further triangular plate 46 is welded to the eye beam 42 and to the web portion of the channel member 24 as shown in Figure 9, to further strengthen the mounting of the plow beam upon the framework of the front section.

The detail view of Figure 6 illustrates more clearly the particular structural association of the channel member with the angle iron members and the plow beam.

At its lower end, the plow beam 42 has attached thereto, in a conventional and known manner, a plow blade 48 which is adapted to open a narrow furrow of about two inches in width or the like, in which it is proposed to transplant the seedlings. Likewise attached to the plow beam 42 and to the plow blade 48 are rearwardly extending wings 50, which constitute parallel guide walls, see Figure 8, slidable inside a furrow or trench 52, as shown in Figure 7, for preventing dirt from sliding from the sides thereof into the trench, and in conjunction with the plow beam 42 serving to maintain, immediately back of the plow blade 48, a cleared portion of trench into which the ends of seedlings may be inserted by the operator of the machine as the machine travels over the area to be planted.

As shown best in Figure 9, the wings or shields 50 at their upper ends may be outwardly curved rearwardly thereof, as at 54, to thus provide guide flanges which facilitate the placing of the seedling between the wings and in the furrow or trench 52.

At its upper end, the plow beam 42 is provided with a forwardly extending supporting bracket 56 having an aperture 58 by means of which the same may be detachably secured to the extremity of the compression bar 14 of the tractor implement lift, while the beam also has a rearwardly extending hook 60.

Likewise welded to the channel member 24 are a pair of rearwardly extending rods 62, terminating in laterally extending extremities 64, see also Figure 11, which form hinge pins by means of which the rear section of the attachment is pivotally and detachably connected with the front section, as set forth hereinafter. As shown best in Figures 1 and 6, the transverse channel member 24 has welded to the inside surface of the same and to its flange 26 a transversely extending rod 66, the ends of which form trunnions and pivots and are received in suitable apertures in the hydraulic implement lift bars 12 of the tractor implement lift, and are detachably secured thereto as by cotter pins or the like 68, see Figure 2, extending through apertures 70 in the bar or axle 66.

It will now be seen that the front section is thus pivotally supported upon trunnions consisting of the extremities of the transverse bar or axle 66 received in the lift bars 12, and by the fastening pin 57, extending through the aperture 58 of the bracket 56 at the upper end of the plow beam 42 and extending through the compression bar 14 of the tractor implement lift. Thus, as the implement lift is raised or lowered, the front section is likewise lifted and dropped so that the plow 48, the coulter disk 34, and the guide wings or shields 50 may be selectively raised above or adjustably thrust into the soil.

The rear section which is pivotally connected to the front section likewise consists of a rigid frame which is composed of the substantially parallel angle iron members 72 and 74, each of which has welded at its front end a plate 76 terminating in a cylindrical sleeve 78 which is adapted to be slidably and pivotally received upon the hinge portion 64 previously mentioned, a suitable cotter pin or the like 80 being provided and extending through an appropriate aperture 82, see Figure 9, for retaining the hinge plate 76 upon the hinge pin 64. When so positioned, it is obvious that the frame member 74 may pivot vertically about the horizontally disposed hinge pin 64. In order to lock the rear frame member to the front frame member without any pivotal movement, a fastening bolt or pin 84 may extend through an aperture in the sleeve portion 78 of the hinge plate 76 and through a corresponding aperture 86 in the hinge pin 64.

A pair of substantially parallel, rearwardly disposed frame members 88 are welded at their forward extremities to the frame members 72 and 74, and extend rearwardly therefrom, and are further braced by vertical reinforcing plates 90 which are rigidly attached to the frame members 88 and to the lower portions of the angle iron members 72 and 74. The vertical reinforcing members 90 may conveniently comprise the downwardly extending parallel legs forming the extremities of a transverse plate 92 which thus extends between the frame members 88 as will be apparent from Figure 2. Depending from the intermediate portion of the transverse plate 92, as shown clearly in Figure 7, is a member 94 and a pair of axles 96 are mounted in the member 94 and in the plates 90 in inclined positions and extend to provide foot rests, as shown in Figure 10. These axles serve to journal wheels 98 which may be rubber tired wheels, if desired, and which are inclined downwardly toward each other and constitute heeling wheels, which, as shown clearly in Figure 7, are positioned to support the weight of the rear section and of the occupant thereof, and by this weight to press the soil against the seedling which is deposited in the furrow or trench 52 for heeling in or planting the seedling.

As will be apparent from Figure 10, a suitable fender or guard construction 100 may be carried by the frame and overlie the two wheels for preventing dirt carried thereby being thrown against the operator and rider upon the device.

A U-shaped bracket 102 is rigidly attached between the frame members 88, and has mounted thereon a seat 104 which is so positioned as to enable the operator to be seated thereon while resting his feet upon the foot rests 96. The operator is thus in position to remove seedlings or plants from a hopper 106 positioned rearwardly of the seat 104 and resting upon transverse bars 108 secured across the frame members 88, and plant the seedlings successively between the guard or wing members 50 as the device is moved along a row.

The U-shaped strap 102, as shown in Figure 10, is provided at its upper ends with laterally extending lugs 110, which are apertured as at 112. As shown more clearly in Figures 1 and 2, a supporting chain or chains 114 may be attached to the lugs 110 by means of the apertures 112, and may be adjustably connected with the rearwardly extending hook 60 at the upper end of the eye beam 42 to thereby adjustably limit the vertical downwardly pivoting movement of the rear section with respect to the front section upon which the same is hinged by the hinge pins 64. By this means, when the entire attachment is raised from the soil as indicated in dotted lines in Figure 1, the weight of the rear section and of the occupant will be carried by the chains directly from the implement lift compression bar 14 which is attached to the bracket 56 at the upper end of the eye beam 42.

From the foregoing, it is felt that the construction and operation of this embodiment of the invention will now be readily understood. With the device assembled as shown in full lines in Figure 1, the tractor may be operated in the usual manner, for either straight row or contour planting, and the vertically pivoting rear section is thus free to swing upon the front section to accommodate itself to any inequalities in the ground or terrain. During this operation, the front section continuously opens a furrow and holds the same open by means of the plow share 48 and the wings 50, so that the operator seated upon the seat 104 may remove seedlings from the hopper 106 and deposit the same through the guide flanges 54 of the wings 50 into the furrow 52, whereupon continued forward travel of the apparatus will withdraw the wings from the seedlings so deposited, and will cause the heeling wheels 98 to press the soil firmly against the sides of the seedling. This operation may be repeated at the desired intervals at which it is desired to plant the seedlings.

Attention is now directed to a modified application of this invention whereby the attachment is applied to the front end of a tractor, as shown in Figures 3–5, it being understood that the construction of the attachment is substantially the same as that set forth in connection with the embodiment just described, with the exceptions to be hereinafter noted.

As will be apparent from Figures 3 and 4, the front end of the tractor 10 is provided with a pair of inclined front wheels 116 which are so positioned that they may be utilized as a substitute for the heeling wheels 98 previously described. For this purpose, the entire attachment is mounted forwardly of the front wheels 116 in the same relative position that the front section is mounted forwardly of the heeling wheels 98 of the previously described embodiment. To permit this arrangement, a rigid supporting frame is adjustably mounted upon and extended forwardly of the tractor 10, this frame including parallel angle iron side members 118 and 120, which are rigidly connected together by suitable transverse frame members as desired. The front section 16 is pivotally mounted between the forward extremities of these frame members 118 and 120 by means of the previously mentioned extremities of the transverse pivot bar 66 which are received in suitable apertures in the frame members. Any suitable mechanism is provided for vertically lifting the front of this frame from the full line to the dotted line position of Figure 3.

It will thus be seen that the front section, including the coulter disk, the plow and the plow wings, are mounted upon the front of the tractor for vertically pivoting movement in substantially the same manner as they were formerly mounted in the previously described embodiment for vertical pivoting movement upon the implement lift. In this embodiment, the rear section 18 of Figure 10 is dispensed with and suitable seats 122 may be supported in any desired manner upon the sides of one or both of the frame members 118 and 120 as shown in Figure 4. Likewise supported upon the sides of these frame members are one or more seedling hoppers 124 which, in this embodiment, are disposed in front of or forwardly of the seats 122. Transversely disposed bars 126 extend from both sides of each of the frame members 118, depending upon whether hoppers and seats are provided on both sides, and constitute foot rests for the operator seated in the seat 122. In order to effect the desired vertical pivotal movement of the front section to thereby selectively position the same at a predetermined depth in the soil as shown in full lines in Figure 3, or raise the same above the soil into an inoperative position as shown in dotted lines in Figure 3, a hydraulic operating means is provided, adapted to be powered by the hydraulic power take-off of the tractor. This means may conveniently comprise a hydraulic cylinder 128 which is pivoted at one end, as at 130, to a support standard 132 mounted upon the transverse reinforcing frame member 134, this support having a bifurcated upper end as at 135, see Figure 4.

A piston, not shown but of any conventional design, is slidably received in the cylinder 128 and is provided with a piston rod 136 which is connected by a bracket 138 which is attached to the previously mentioned support bracket 56 at the upper end of the plow beam 42, by means of a pivot pin 140 received in the aperture 58. Suitable hydraulic conduits 142 in the form of hose or the like are attached to the hydraulic cylinder 128 and connect the same with the hydraulic power take-off of the tractor, this arrangement not being illustrated, inasmuch as it is of conventional design and, in itself, forms no part of this invention. Adjusting chains 144 are attached to the hooks 40 at the upper ends of the frame members 20 and 22, and to other hooks 146 on the frame members 118 and 120 to thereby limit the downward pivoting movement of the attachment section 16 in the same manner as employed in the preceding embodiment. The operation of this embodiment is identical with that set forth for the preceding embodiment, except that the hopper and operator or operators are carried by the tractor itself rather than upon a rear section. In both embodiments, however, the driver of the tractor has his vision to the front unobstructed, and the single operator or planter of the embodiment of Figures 1 and 2 and the one or more planters of the embodiment of Figures 3 and 4 can perform their planting operations without interference with or by the driver of the tractor.

It will be apparent that the two forms of the invention disclosed in the drawings are adapted to transplant seedlings in a single row. However, it is within the purview of this invention to duplicate the structure so that two or more rows may be planted at one time by merely multiplying the number of the attachments and providing the necessary supports for mounting the same upon the tractor, as in Figures 3 and 4 or upon the implement lift of the tractors, as in Figures 1 and 2.

Where desired, a plant watering system may be provided with this transplanter, including a water tank mounted on the plow beam, on the attachment or on the tractor and provided with flexible conduits to dispense water to the furrow where the plant is to be planted. A suitable manually operable valve may be installed in this conduit.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having disclosed and described the invention, what is claimed as new is as follows:

In combination with a tractor of the type having a pair of trailing parallel power-lifted draft bars and a compression bar above said draft bars disposed parallel thereto and centrally thereof, a plant-setting attachment comprising a front frame section and a rear frame section pivoted to the front frame section, said front frame section including a transverse member disposed between and pivoted to the rear ends of said draft bars, a generally vertical plow beam rigidly secured to said member and disposed centrally of said draft bars, said beam extending above and below said member, the upper end of said beam being pivotally connected to said compression bar and the lower end of said beam having a winged plow secured thereto, said rear frame section including frame parts having front ends pivotally connected to said member to swing about a horizontal axis and rear ends mounting a pair of furrow closing wheels, a seat for an operator mounted on said rear frame section, and flexible means interconnecting said front and rear frame sections, whereby in lowered operative position of the plow the rear frame section is free to swing vertically as the wheels follow the contour of the ground but said flexible means limit downward swing of said rear frame section to lift the same with lifting of the front frame section to transport position.

References Cited in the file of this patent

UNITED STATES PATENTS

| Number | Name | Date |
|---|---|---|
| 1,007,735 | Rodman | Nov. 7, 1911 |
| 1,083,923 | Dillow | Jan. 13, 1914 |
| 1,102,924 | Hooks | July 7, 1914 |
| 1,111,613 | Pearce | Sept. 22, 1914 |
| 1,171,263 | Seymour | Feb. 8, 1916 |
| 1,253,759 | Willis | Jan. 15, 1918 |
| 1,472,888 | Rose | Nov. 6, 1923 |
| 1,799,642 | Remillard | Apr. 7, 1931 |
| 1,891,488 | White | Dec. 20, 1932 |
| 1,928,362 | Schutmaat | Sept. 26, 1933 |
| 1,972,281 | Walling | Sept. 4, 1934 |
| 2,024,778 | Ray | Dec. 17, 1935 |
| 2,179,793 | Lewison | Nov. 14, 1939 |
| 2,228,490 | Smith | Jan. 14, 1941 |
| 2,330,283 | Hipple | Sept. 28, 1943 |
| 2,336,410 | McKay | Dec. 7, 1943 |
| 2,351,078 | Silver | June 13, 1944 |
| 2,356,231 | Ferguson | Aug. 22, 1944 |
| 2,445,145 | Love | July 13, 1948 |
| 2,521,631 | Griffiths | Sept. 5, 1950 |

OTHER REFERENCES

Agricultural Engineering, vol. 28, No. 9, September 1947; pages 387–390 and 396.

Farm Implement News, September 13, 1945; pages 46–48.

Farm Implement and Machinery Review, vol. 74, No. 880, August 1, 1948; page 380.